March 20, 1934.                    H. I. MORRIS                    1,951,835
                    MOTOR AND SYSTEM OF CONTROLLING THE SAME
                    Filed Nov. 9, 1929          2 Sheets-Sheet 1

INVENTOR
Howard I. Morris
BY
ATTORNEY

Patented Mar. 20, 1934

1,951,835

UNITED STATES PATENT OFFICE 1,951,835

MOTOR AND SYSTEM OF CONTROLLING THE SAME

Howard I. Morris, Lakewood, Ohio, assignor to The Yoder-Morris Company, Cleveland, Ohio, a corporation of Ohio Application November 9, 1929, Serial No. 406,003

6 Claims. (Cl. 172—278)

This invention relates to a novel system of controlling the direction of rotation of electric motors.

In the present types of alternating or direct current motors, it is necessary to transpose two of the stator or field terminals to produce rotation in one direction or the other. This requires some kind of switching device having a sufficient number of insulated poles, to make the necessary transposition and at the same time breaking the circuit to an additional winding. The switching devices now in use usually comprise either a three or four pole, double throw knife switch, or a three or four pole, double throw contactor. In the case of a small motor, the cost of such a switching device often is double that of the motor, making it almost prohibitive in certain classes of apparatus which must be sold at a nominal price.

One object of the invention is to provide for the reversal of the rotation of a motor, without having to transpose the terminals of any of the windings, thus making it possible to use a single pole, double throw switch or a relay, at a considerable saving in cost.

My novel operating system is accomplished by providing two field windings of opposite effect in the motor, these field windings being adapted either for starting alone or, under the circumstances such as found in direct current motors, for the continuous actuation of the fields.

When applied to split phase alternating current motors the improved system is based upon the use of the ordinary starting and running circuits in the field and in addition the introduction of a second starting field wound to cause the rotor to move in the reverse direction when this latter field is used in place of the first starting field. As soon as the rotor attains sufficient speed this starting field circuit is broken and rotation continues under the influence of the usual normal running field.

By way of illustrating the preferred form of carrying out this invention there is illustrated in the accompanying drawings wiring diagrams as applied to the particular conditions existing in these motors. Thus, Fig. 1 is a wiring diagram of the operating system applied to a single phase alternating current motor having a push button control through relay circuit closers;

Figure 1:
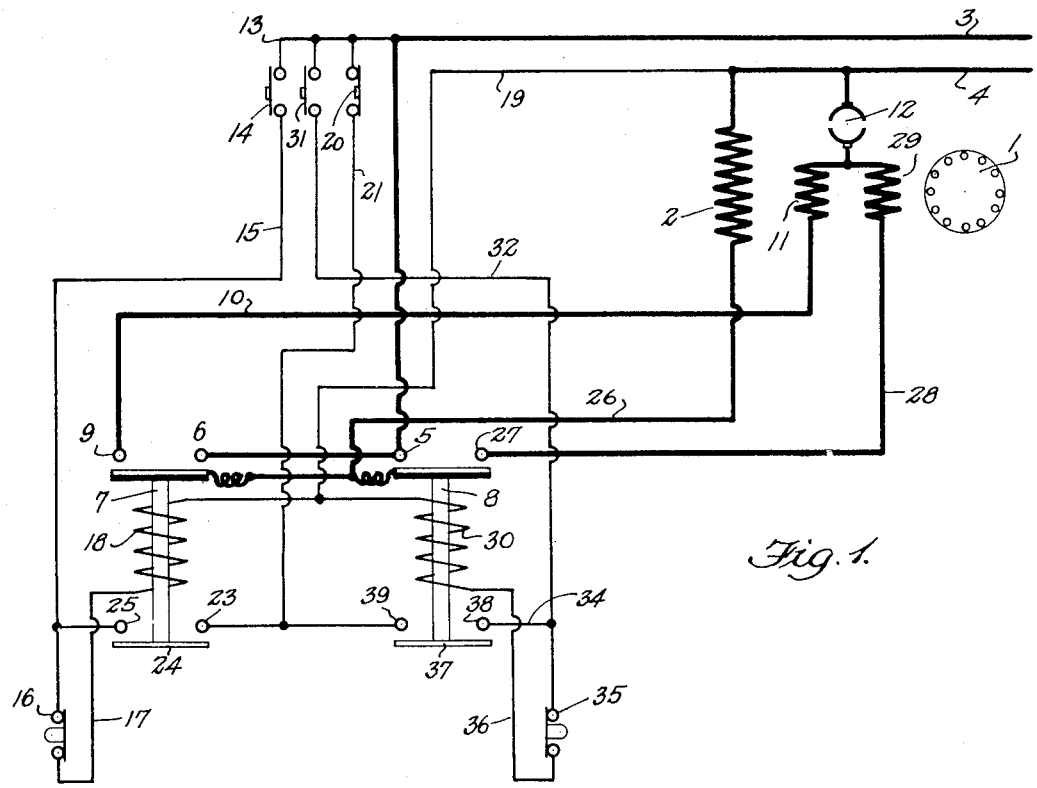

For the purposes of illustration, I have shown diagrammatically in Fig. 1 the wiring required for a single phase alternating current induction motor having a rotor 1, a normal running field 2 and conductors 3 and 4 from a source of alternating current. Conductor 3 is connected to terminals 5 and 6 which form contact members for relays 7 and 8, respectively.

Terminal 9, which is opposite relay 7 is connected by means of conductor 10 to the forward starting coils 11 in the field of the motor. The starting circuit is completed through the centrifugal starting switch or circuit breaker 12 connecting the coils 11 with the line conductor 4.

Operation of the relay 7 is carried out by means of a switch circuit comprising the conductor 13 running from the line wire 3 to the forward push button switch 14. The latter is connected by means of conductor 15 to a limit switch or other safety device 16 from which the current is led by conductor 17 through the relay coil 18 and thence by conductor 19 to the opposite line wire 4. The relay coil 18 surrounds the armature of relay 7 and serves to draw the latter upward closing the circuit from 6 to 9 whenever the forward push button switch 14 is closed.

The relay 7 is maintained in closed circuit position during running of the motor by means of a by-pass switch circuit maintained through the coil 18 and around the push button switch 14 so that the opening of the latter is ineffectual to stop the motor. This by-pass circuit comprises a stop button switch 20 biased to closed position in a conductor 21 connected at one end to the lead 13 and at the other end to a lead 22. The lead 22 has one terminus as a contact 23 suitably arranged in relation to the relay 7 so that a connector 24 on the relay 7 may close the circuit between contact 23 and contact 25. Contact 25 is connected to the conductor 15 and through the limit switch 16 to conductor 17, coil 18, lead to conductor 4.

The above arrangement is that customarily used to establish normal forward running of the rotor and maintaining its operation until the switch 20 or limit switch 16 is opened, in which event the relay 7 operates to open the field circuit. It therefore will be seen that the motor may be stopped by momentarily operating the stop button switch 20 or the limit switch 16, thus de-energizing the coil 18 and breaking the field circuit through the relay 7 and the relay circuit through connector 24.

It will be understood that the push button provides for the stopping of the motor at any time manually, whereas the limit switch provides for the automatic stopping of the motor for example, when the element or body moved by it reaches a predetermined position.

In order to actuate the rotor in a reverse direction there is provided a second relay 8 also connected to the running coils 2 by means of a common conductor 26. The relay 8 forms a circuit closer between the contact point 5 and on opposite contact 27 which in turn is connected by means of lead 28 to the reverse starting coils 29. The latter is wound and arranged within the field structure of the motor so that its effect upon the rotor will be exerted in an opposite direction to that produced with the forward starting coils 11. The coils 29 are connected to the same centrifugal starting switch 12 that runs between the starting coils 11 and the line conductor 4.

The upward movement of the relay 8 additionally closes the circuit between 5 and 26, thus causing current to flow through the normal running coils of the field and thus maintaining rotation of the rotor after the switch 12 has opened.

The relay 8 is lifted by means of the relay coil 30. The coil is connected at one end to conductor 13 and line 3 by means of the reverse push button switch 31, which is normally biased to open position. The switch 31 has a conductor 32 leading to a branch 34 and a limit switch 35. The latter in turn is connected through lead 36 to the coil 30 and by means of the conductor 19 closes the circuit through the line 4. The connector 37 at the lower end of the armature of the relay 8 serves to close the circuit between contact 38 on branch 34 and contact 39 on the lead 22. It will thus be apparent that after the switch 31 is opened the coil 30 will hold the relay 8 up by reason of the closed circuit through the stop push button switch 20 and that when the latter is manually opened or the limit switch 35 operated, the relay 8 will drop, opening the circuit through the field coils.

In the invention according to this type of device, when it is desired to start the motor in a forward direction the closing of push button switch 14 actuates relay 7 to close the circuit through contacts 6, 9, the starting coils 11 and running coils 2 by which the rotor is caused to take up normal rotation reaching sufficient speed to open the centrifugal switch 12. When this point has been reached, the circuit through the centrifugal switch is opened, cutting out coils 11, the motor continuing in operation by means of the running field 2.

Since push button switch 20 is normally closed, the release of switch 14 does not cause the opening of relay 7, but the latter is held up by the closed circuit from switch 20 across contact 24 and the coil 18. The motor may be stopped by opening circuit switch 20 as previously stated.

Rotation in the opposite direction is established by the circuits which are closed from contact 5 through actuation of relay 8. This relay is closed by switch 31 and maintained closed by switch 20, thus energizing the starting coils 29 and running coils 2, which causes the rotor to move in reverse direction. Starting coils 29 cease operation by the opening of switch 12 as soon as the running coils 12 are capable of maintaining the rotation. It is of course obvious that the direction of rotation is controlled by the coils 11 and 29 and that once in motion the rotor continues in either direction by the fields created in the running coils 2.

The above description illustrating the application of the invention for the push button control of a single phase alternating current induction motor applies equally well to other types of motors and controls.

Figures 2, 3:
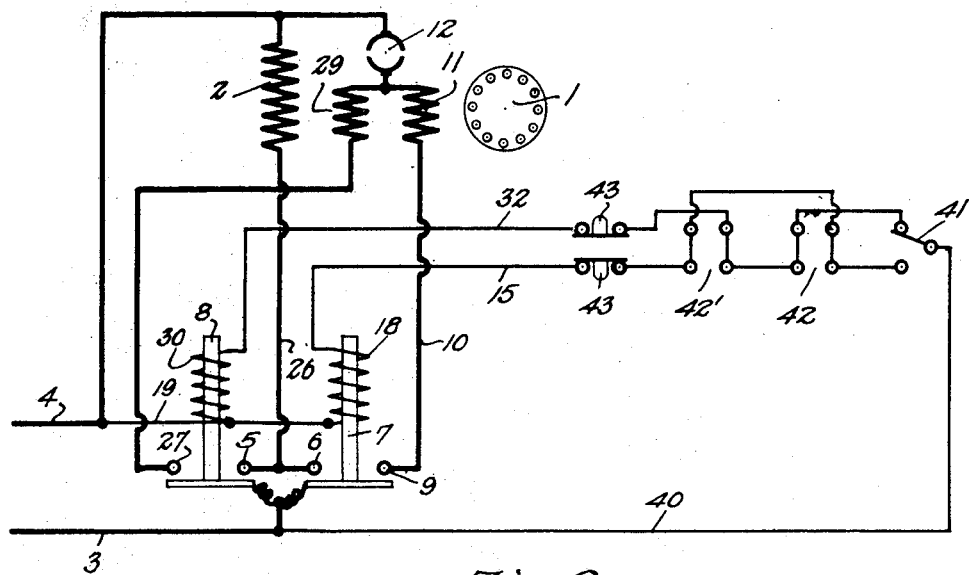
Fig. 2 is a diagram of the operating system substituting one or more 4-way switches in place of the push button control.
Fig. 3 is a diagram of the system as applied to a series wound direct current motor.

For example in Fig. 2 there is illustrated the system for selectively rotating the motor in either direction by means of 3-way and 4-way switches. In this figure, 1 represents the rotor having the same running field coils 2 and the supply lines 3 and 4.

The field 2 is in circuit with the line 4 and by means of conductor 26 is connected to the contacts 5 and 6. The circuit through the running field 2 from the line 3 is closed through either relay 7 or relay 8 and the connections of the latter elements to the line 3. Also the relay 7 closes the circuit from line 3 through the contact 9, lead 10 and the forward starting coils 11. These starting coils are also connected to lead 4 through the centrifugal starting switch 12.

The reverse relay 8 closes the circuit from lead 3 through contact 27, conductor 28 and the reverse starting coils 29, which in turn connects to the lead 4 through the centrifugal starting switch 12 in the manner already described.

Relays 7 and 8 are energized through the switch circuits which include the conductor 40, a 3-way switch 41 and selective 4-way switches 42 and 42'. The latter have leads running through the limit switches 43, 43. One limit switch 43 is connected by lead 15 through the coil 18 of relay 7 and from there it is in circuit with lead 4 by means of conductor 19.

The other limit switch 43 is connected by means of lead 32 through coil 30 and thence by means of conductor 19 to the line 4.

It will be apparent that suitable operation of the 3-way switch 41, 4-way switch 42 or 4-way switch 42' and the appropriate outlet therefrom through lead wire 15 will energize coil 18 to close the starting circuit through contact 9 and the running field circuit through contact 6.

As soon as the approximate velocity has been acquired by the rotor 1, centrifugal switch 12 opens the starting field circuit through the coils 11, but rotation is continued by means of the running field coils 2.

Rotation is maintained as long as the coil 18 remains energized and holds the relay 7 in position. Breaking the circuit through the coil opens the motor circuit and stops the rotor.

Rotation in the reverse direction is accomplished by suitable switching to close circuits through 32 without closing the circuits through lead 15. It follows that coil 30 is energized and the circuit of relay 8 closed through contact 5 leading to the running field coils 2 and contact 27 leading to the reverse starting field coils.

In Fig. 3 I have shown a series direct current motor having a plurality of field winding one for forward and one for reverse rotation. The armature 44 is connected by brush 45 on one side to the line 46 and by brush 47 on the other side to lead 48. One branch of lead 48 passes through field coils 49, limit switch 50, lead 50', 4-way switches 51, 51, and a suitable 3-way switch 52. The latter is connected with the opposite side 53 of the supply line. The 4-way switches 51, 51, are connected to an alternative lead 54 and a limit switch 55, which latter is connected through reverse field coils 56 to the conductor 48.

Selective energization of series field coils 49 or 56 will determine the direction of rotation of the armature.

Figures 4, 5:
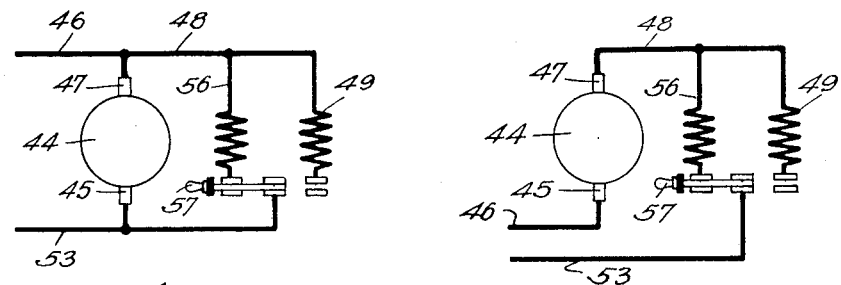
Fig. 4 is the same applied to a series wound direct current motor relying upon a knife switch.
Fig. 5 shows the invention as applied to a shunt wound direct current motor.

Fig. 4 is a diagrammatic view of a similar series wound direct current motor showing in the simplest form the use of a single pole double throw knife switch 57 to connect one side of the current supply alternatively through the forward series field coils 49 or the reverse field coils 56. A common lead 48 is connected to the coils 49 and 56 and passes to brush 47. The armature 44 has a second contact brush 45 connected to the opposite side 46 of the supply line. The operation of this circuit is self-evident in establishing rotation either forward or reverse, dependent upon which of the two series field coils is used.

A similar knife switch 57 is shown in Fig. 5 as connecting one side 53 to the supply line through either shunt field 49 or 56 and the common lead 48 to the opposite side 46 of the supply line. In this case the armature 44 is shunted around the field by means of the brushes 45 and 47.

Figure 6:
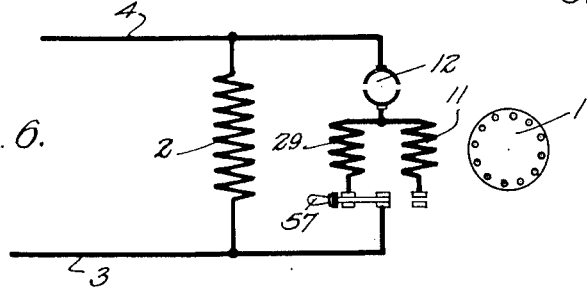
Fig. 6 shows the use of the invention in its simplest form when applied to an alternating current induction motor.

In Fig. 6 I have shown a similar arrangement as applied to an alternating current induction motor in which the rotor 1 is used. Forward starting coils 11 are connected on one side to the centrifugal starting switch 12 and thence to the line 4. A knife switch 57 connects coils 11 to the opposite side 3 of the line. The running field coils 2 are shown shunted between the leads 3 and 4. The reverse coils 29 also run between switch 12 and knife switch 57. Either set of starting coils may be put into circuit by means of the knife switch and thus determine the direction of rotation which will be maintained by the running coils 2.

The above explanation of my invention is merely illustrative of the preferred form and the invention may be applied in any other form that may be selected within the range of equivalents and scope allowed by the following claims.

What I claim is:

1. In a system for operating a single phase alternating current motor, a rotor or armature, a normal field winding therefor, a starting field winding, a second starting field winding serving to move the rotor in the reverse direction, a centrifugally operating circuit-breaker for opening the circuit through both starting field windings simultaneously and means to close the circuit of the normal field winding and simultaneously to energize either said starting field at will.

2. In a system for operating a single phase alternating current motor, a rotor or armature, a normal field winding therefor, a starting field winding, a second starting field winding serving to move the rotor in the reverse direction, a centrifugally operating circuit breaker for said starting field windings and a single means to energize the normal field together with one of said starting fields.

3. In a system for operating a single phase alternating current motor, a source of current for the motor, a rotor or armature, a normal field winding therefor, a starting field winding, a second starting field winding serving to move the rotor in the reverse direction, a centrifugally oprating circuit breaker for said starting field windings and a relay switch in circuit with the source of current and adapted to be connected simultaneously with the normal field winding and by a parallel circuit to one of said starting field windings.

4. In a system for operating a single phase alternating current motor, a rotor, a normal field winding, a starting field winding, a second starting field winding serving to move the rotor in the reverse direction, a centrifugally operating circuit breaker for said starting field windings, a source of current, relay switches in circuit with said source of current, each said relay switch operating to close simultaneously the normal field winding circuit and one of said starting field windings, and circuits for operating said relays.

5. In a system for operating a single phase alternating current motor, a rotor, a normal field winding, a starting field winding, a second starting field winding serving to move the rotor in the reverse direction, a centrifugally operating circuit breaker for said starting field windings, a source of current, relay switches in circuit with said source of current, each said relay switch operating to close simultaneously the normal field winding circuit and also one of said starting field windings, separate circuits with normally open switches for energizing each relay and a relay circuit with a normally closed switch by-passing both normally open switches.

6. In a system for operating a single phase alternating current motor, a rotor, a normal field winding, a starting field winding, a second starting field winding serving to move the rotor in the reverse direction, a centrifugally operating circuit breaker for said starting field windings, a source of current, relay switches in circuit with said source of current, each said relay switch operating to close simultaneously the normal field winding circuit and also one of said starting field windings, separate circuits with normally open switches for energizing each relay and a de-energizing relay circuit common to both relays.

HOWARD I. MORRIS.